United States Patent [19]

Schlingensiepen et al.

[11] Patent Number: 5,049,225
[45] Date of Patent: Sep. 17, 1991

[54] METHOD AND APPARATUS FOR TERMINATING AN OPTICAL FIBER WITH A CURVED BORE BLOCKING MEMBER

[75] Inventors: Robert Schlingensiepen, San Francisco; Frank H. Levinson, Redwood City, both of Calif.

[73] Assignee: Raychem Corp., Menlo Park, Calif.

[21] Appl. No.: 471,682

[22] Filed: Nov. 27, 1989

Related U.S. Application Data

[63] Continuation of Ser. No. 183,511, Apr. 14, 1988, abandoned, which is a continuation of Ser. No. 860,262, May 6, 1986, abandoned.

[51] Int. Cl.$^5$ .................................................. G02B 7/00
[52] U.S. Cl. ................................... 156/294; 264/1.5; 385/77
[58] Field of Search .............. 156/158, 159, 293, 294, 156/304.2, 433, 535, 502, 509; 264/1.5; 350/96.20, 96.21, 96.22, 96.15, 320; 65/36

[56] References Cited

U.S. PATENT DOCUMENTS

| | | | |
|---|---|---|---|
| 4,303,304 | 12/1981 | Ruiz | 350/96.2 |
| 4,458,983 | 7/1984 | Roberts | 350/96.2 |

FOREIGN PATENT DOCUMENTS

| | | | |
|---|---|---|---|
| 0155318 | 12/1980 | Japan | 350/96.2 |
| 0056809 | 4/1982 | Japan | 350/96.2 |
| 0172610 | 10/1983 | Japan | 350/96.2 |

OTHER PUBLICATIONS

Bauman et al., "Fiber-Optic Cable Termination Method", IBM Technical Disclosure Bulletin, vol. 24, No. 2, Jul. 1981.

*Primary Examiner*—Geoffrey L. Knable
*Attorney, Agent, or Firm*—Dennis E. Kovach; Herbert G. Burkard

[57] ABSTRACT

An apparatus for terminating an optical fiber includes a resiliently deformable spherical member disposed in contact with a front end of a bore of an optical fiber contact body. Subsequent to softening an adhesive disposed within the contact body bore, an optical fiber is inserted through the bore and the adhesive until the fiber contacts the blocking member and deforms it. The resiliency of the blocking member causes adhesive to be wiped off the front face of the fiber being terminated and into an annulus formed between an outer cylindrical surface of the fiber and an inner cylindrical surface of the bore, and causes the fiber front end to be recessed a predetermined amount from a front end of the contact body.

10 Claims, 1 Drawing Sheet

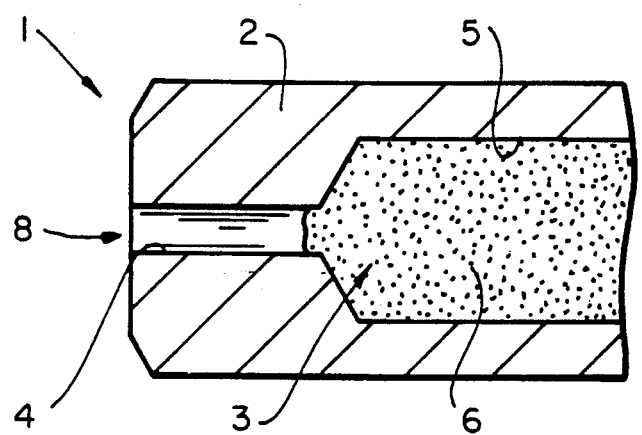
FIG_1
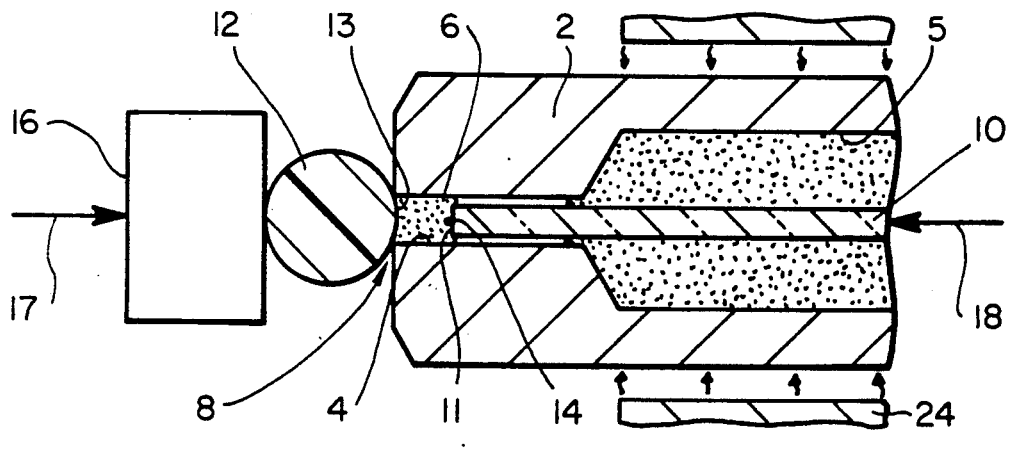
FIG_2
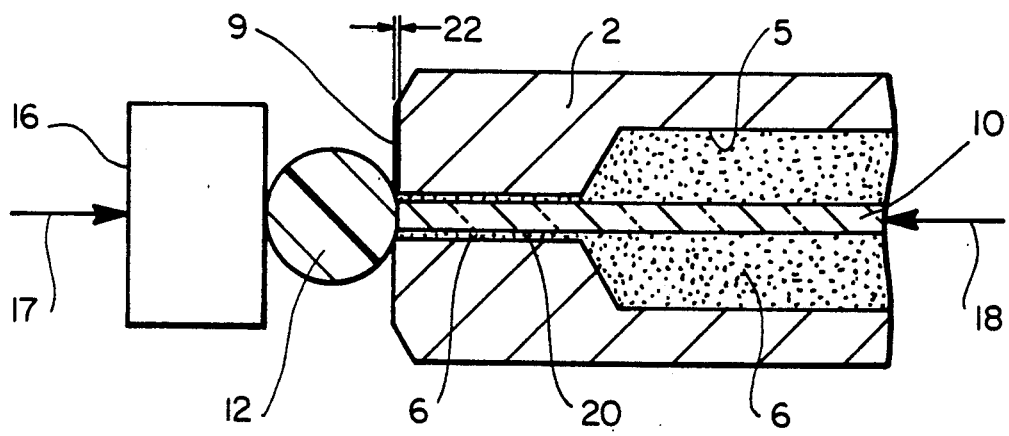
FIG_3

METHOD AND APPARATUS FOR TERMINATING AN OPTICAL FIBER WITH A CURVED BORE BLOCKING MEMBER

This application is a continuation of application Ser. No. 183,511, filed Apr. 14, 1988, now abandoned, which is a continuation of application Ser. No. 860,262, filed May 6, 1986, now abandoned.

BACKGROUND OF THE INVENTION

The present invention relates to a method and apparatus for terminating an optical fiber.

Numerous methods have been proposed in the prior art for terminating optical fibers, each of which possesses certain advantages and disadvantages. According to one such method, an optical fiber is secured within a contact body so that a fiber end protrudes from a front face of the contact, and thereafter the fiber end is ground down and polished. This method is disadvantageous since grinding and polishing a fiber end is an extremely craft sensitive procedure not easily done in the field.

SUMMARY OF THE INVENTION

Accordingly, it is an object of the present invention to eliminate the above-noted drawbacks of prior art apparatuses for terminating optical fibers.

These and other objects are achieved by an apparatus for terminating an optical fiber which includes an optical fiber contact body having an adhesive disposed within a bore therein, the bore being sized so as to receive an optical fiber to be terminated, and means for blocking a front end of the bore as the optical fiber is inserted therein for termination. Preferably, the blocking means comprises a blocking member which is made of a resiliently deformable material and is shaped so as to seat and seal against a front end of the bore which prevents adhesive from leaking out of the front end of the bore when the optical fiber is inserted therein. Accordingly, the adhesive is forced back into the bore via a small space between an outer cylindrical surface of the fiber and an inner cylindrical surface of the bore so as to substantially fill all voids otherwise existing therein. Furthermore, preferably the blocking member has a curved shape, e.g. convex, spherical, etc., which causes the blocking member to wipe a front face of the optical fiber clean as the optical fiber contacts and deforms the blocking member. By appropriately choosing an elastic modulus of the blocking member as well as its size and shape, and by appropriately choosing a magnitude of a force by which the blocking member is seated against the front face of the bore as well as the force by which the optical fiber is inserted against the blocking member, a front face of the optical fiber can be recessed from a front face of the contact body a predetermined distance, all these factors generally being dependent on the fiber diameter. Subsequent to terminating the optical fiber by the method and apparatus described, the blocking member is then removed from the contact body so that the terminated optical fiber contact can then be later joined to another terminated optical fiber contact.

BRIEF DESCRIPTION OF THE DRAWINGS

FIG. 1 illustrates a contact suitable for use with the present invention for terminating an optical fiber;

FIG. 2 illustrates one preferred embodiment of the invention useable with the contact as illustrated in FIG. 1; and FIG. 3 illustrates the embodiment of FIG. 2 except that an optical fiber 10 is shown as being fully inserted within the contact in FIG. 3 whereas it is only partially inserted in FIG. 2.

DESCRIPTION OF THE PREFERRED EMBODIMENTS

FIG. 1 illustrates a contact 1 suitable for use with the present invention, the contact 1 including a contact body 2 having a cylindrical bore 3 therein of non-uniform diameter, a front portion 4 of the bore 3 being smaller than a rear portion 5 of the bore. The bore front portion 4 is preferably sized so as to be only slightly larger than an optical fiber 10 to be terminated, and accordingly is cylindrically shaped, its inside diameter preferably being between 2 and 20 microns larger than the fiber outside diameter, more preferably between 4 and 16 microns, most preferably between 4 and 8 microns, a preferred embodiment being 4 microns. The smaller the difference between the inside diameter of the bore portion 4 and the outside diameter of the fiber 10 the better the fiber is aligned along a center axis of the contact body 2, a disadvantage of too small an inside-outside diameter difference being increased costs associated with required machining tolerances.

The term "optical fiber" as used herein refers to a waveguide, preferably but not necessarily cylindrical, comprising a core and a cladding of optically transparent material, e.g. glass or plastic, with the cladding having an index of refraction lower than the core.

Means for securing the fiber 10 within the bore 3, e.g. preferably an adhesive 6, is preferably disposed within the enlarged rear portion 5 of the bore. The bore portion 5 is sized so as to accommodate a sufficient amount of adhesive 6 so as to enable the optical fiber 10 to be adequately secured within the contact body 2. The adhesive preferably is solid in cross-section, and can comprise solder, glass, or a multi-component mixture. Preferably the adhesive is stable at room temperature and is solid so that the contact 1 can be stored for an appreciable length of time without losing any significant amount of its functional attributes. Preferably the adhesive should be softenable upon being heated so that the optical fiber 10 can be inserted therethrough subsequent to heating. After the fiber insertion, the adhesive is then hardened by further heating when chemical curing of multi-component adhesive is required or by simply cooling when the adhesive is of a non-reactive type, e.g. solder or glass. In the event the adhesive comprises a thermoset, it preferably should comprise a multi-component room-temperature stable mixture which when heated softens, liquifies, mixes and cures to form an adhesive capable of adhering to the optical fiber and the contact body, one preferred embodiment of such a mixture being a novolac epoxy resin, either dicyandiamide or substituted dicyandiamide, and imidazole.

The invention is best understood by referring to FIGS. 2 and 3, FIG. 2 showing a state of the invention whereby an optical fiber has only been partially inserted into the contact body 2, with the state shown in FIG. 3 being with the fiber 10 being totally inserted. In these figures, a blocking member 12 is disposed in contact with and against a front end 8 of the bore 3, and held thereagainst by a force applied in the direction of arrow 17, this force being generated by any appropriate force generating means 16, the means 16 shown comprising a pressure block.

Preferably the blocking member has a curved shaped region 13 which seats against the bore front end 8, and blocks the end 8. The region 13 is preferably curved in three dimensions, a preferred embodiment being a convex shape or spherical shape, though a flat region 13 is included within the scope of the invention. The entire blocking member 12 can, if desired, comprise a sphere, though other shapes are suitable as well, with optimum results being obtained when the region 13 is curved. To achieve all the advantages of the invention, the blocking member 12, or at least its curved shaped region 13, is formed of a resiliently deformable material which has a radius such that the region 13 is deformed when contacted by a front face 11 of the optical fiber 10 when the fiber 10 is inserted into the contact body along a direction indicated by the arrow 18, this arrow being indicative of another force generating means, constructions of the force generating means 16, 18 being well known in the art.

A preferred material of the blocking member is nylon. As can be appreciated from examining FIGS. 2 and 3, since the blocking member region 13 has a curved shape, a center point 14 on the optical fiber front face 11 will first contact the region 13, and as the region 13 deforms by applying further insertion forces 18 to the fiber 10, circular points on the optical fiber front face 11 closest to the center point 14 will progressively contact the region 13 until the region 13 is substantially flattened as illustrated in FIG. 3. Accordingly, as the region 13 flattens, adhesive 6 which is removed from the bore rear portion 5 and disposed in front of the optical fiber front face 11 in the bore front portion 4 is wiped off the optical fiber front face so as to clean this face 11. In addition, the blocking member 12 is seated against the bore front end 8 and is held thereagainst by the force 16 which preferably is chosen to be of a magnitude sufficient to maintain the seating when the region 13 is exposed to the fiber force 18 exerted by the fiber front face 11. As adhesive is wiped from the fiber front face 11 it is forced rearwardly in the direction of the arrow 17 and into a cylindrical annulus 20 formed between the outer cylindridal surface of the fiber 10 and the inner cylindrical surface of the bore front portion 4 so as to substantially fill the portion annulus 20 and eliminate or minimize any void formation located therein.

A magnitude of the forces 16, 18 and a size of the blocking member region diameter and its resiliency preferably are all chosen such that subsequent to deforming the region 13 and achieving steady state the fiber front face 11 is recessed an optimum distance 22 from a front face 9 of the contact body 2. Accordingly, when the optical fiber 10 is terminated using the method and apparatus described herein, its front face will not contact a front face of a similarly terminated optical fiber which could cause scratching when the contacts move relative to each other, as can occur due to vibration loads, for example. Preferably, the magnitude of the distance 22 is between 1 and 6 microns, more preferably between 2 and 4 microns.

Accordingly, it can be appreciated that to optimally terminate an optical fiber 10, an apparatus 24 illustrated in FIG. 2 is first used to heat and soften the adhesive 6 so that the front face 11 of the optical fiber can be inserted through the bore rear portion 5 so as to cause a portion of the adhesive 6 to be disposed in front of the fiber front face 11 in the bore front portion 4. Thereafter, subsequent to totally inserting the fiber 10 into the contact body so as to press up against the blocking member 12, the adhesive is further heated as required to cure it or to allow its viscosity to reach a level whereby substantially the entire bore front portion 4 is filled with the adhesive, and thereafter the adhesive is allowed to cure and set and/or simply cool to room temperature. Thereafter, the blocking member 12 is removed, and the terminated optical fiber is ready to be connected, as desired.

Though the invention has been described by reference to one preferred embodiment thereof, the invention is not to be so limited and it to include all reasonable equivalents thereof, and accordingly is to be limited only by the appended claims.

What is claimed is:

1. A method for terminating an optical fiber, comprising the steps of:

blocking a front end of a bore formed within an optical fiber contact body with a bore blocking member, the bore being filled with a solid hardened adhesive; and softening the adhesive so as to allow an optical fiber to be inserted through the softened adhesive and into the bore; and inserting an optical fiber through the softened adhesive and the bore such that a front end of the optical fiber contacts and deforms the bore blocking member, the blocking member having a curved shape in a region confronting the front end of the bore and sized so as to sealingly seat against the front end of the bore, such that a front face of the inserted optical fiber is recessed from a front end of the contact body after contacting the blocking member, the curved shaped region of the blocking member being made of a material which is resiliently deformable so that the curved shaped region of the blocking member removes the adhesive from the front face of the optical fiber as the optical fiber contacts and deforms the curved shaped region of the blocking member; and hardening the adhesive.

2. The method of claim 1, the front end of the bore being blocked with a force sufficiently large such that adhesive is forced within an annulus defined by an outer cylindrical surface of the front end of the optical fiber and an inner cylindrical surface of a front portion of the bore.

3. The method of claim 2, further comprising the step of removing the blocking member from the front end of the bore subsequent to the adhesive hardening.

4. An apparatus for terminating an optical fiber, comprising:

an optical fiber contact body having a bore therein, the bore being sized so as to be able to receive the optical fiber;

a solid hardened adhesive disposed within the bore, the adhesive being softenable to allow the optical fiber to be inserted therethrough and into the bore;

means for blocking a front end of the bore while the optical fiber is inserted therein for termination through the adhesive while it is in its softened state;

the blocking means having a curved shape in a region confronting the front end of the bore and sized so as to sealingly seat against the front end of the bore, such that a front face of an inserted optical fiber will be recessed from a front end of the contact body after contacting the blocking means, the curved shaped region of the blocking means being made of a material which is resiliently deformable so that the curved shaped region of the blocking means is capable of removing the adhesive from the front face of the optical fiber as the optical fiber contacts and deforms the curved shaped region of the blocking means.

5. The apparatus of claim 4, further comprising:
first force means for urging the curved shaped region of the blocking means against the front end of the bore; and
second force means for urging the optical fiber front face against the curved shaped region of the blocking means.

6. The apparatus of claim 5, the curved shaped region of the blocking means being formed of a radius of curvature and of a material having a resilience such that the front face of the optical fiber is recessed from the front end of the bore a predetermined amount when the optical fiber and the blocking means are urged toward one another by the first and second force means.

7. The apparatus of claim 6, forces generated by the first and second force means being determined so that at least some of the adhesive is forced within an annulus between an outer wall of the optical fiber and a front portion of the bore.

8. The apparatus of claim 7, the bore having a non-uniform cross-sectional profile, the front portion of the bore being smaller in cross-section than a rear portion of the bore, the adhesive being selected from the group of materials consisting of glass, solder, and a multi-component thermoset.

9. The apparatus of claim 4, the curved shape being convex.

10. The apparatus of claim 4, the curved shape being spherical.

* * * * *